United States Patent [19]

Wefers et al.

[11] Patent Number: 5,719,650

[45] Date of Patent: Feb. 17, 1998

[54] HIGH-FIDELITY SPATIAL LIGHT MODULATOR

[75] Inventors: Marc M. Wefers, Somerville; Keith A. Nelson, Newton, both of Mass.

[73] Assignee: Massachusetts Institute of Technology, Cambridge, Mass.

[21] Appl. No.: 439,822

[22] Filed: May 12, 1995

[51] Int. Cl.⁶ ................... G02F 1/1341; G02F 1/1335
[52] U.S. Cl. ................... 349/74; 349/75; 349/99
[58] Field of Search ............ 359/53, 63; 345/4, 345/5, 6; 349/117, 119, 74, 75, 76

[56] References Cited

U.S. PATENT DOCUMENTS

| | | | |
|---|---|---|---|
| 4,485,376 | 11/1984 | Noble | 345/4 |
| 4,521,775 | 6/1985 | Noble | 345/4 |
| 4,655,547 | 4/1987 | Heritage et al. | 359/563 |
| 4,824,216 | 4/1989 | Perbet et al. | 359/53 |
| 4,848,877 | 7/1989 | Miller | 359/53 |
| 4,917,465 | 4/1990 | Conner et al. | 359/53 |
| 4,928,316 | 5/1990 | Heritage et al. | 359/154 |
| 4,952,036 | 8/1990 | Gulick et al. | 359/53 |
| 5,132,824 | 7/1992 | Patel et al. | 359/78 |
| 5,237,435 | 8/1993 | Kurematsu et al. | 359/53 |
| 5,245,451 | 9/1993 | Wu et al. | 359/53 |
| 5,264,952 | 11/1993 | Fukutani et al. | 359/53 |
| 5,465,103 | 11/1995 | Yoshioka | 359/53 |

FOREIGN PATENT DOCUMENTS

| | | | |
|---|---|---|---|
| 274-391 | 7/1988 | European Pat. Off. | 359/53 |
| 54-135551 | 10/1979 | Japan | 359/53 |
| 58-34429 | 2/1983 | Japan | 359/53 |
| 60-93418 | 3/1985 | Japan . | |

OTHER PUBLICATIONS

Wefers et al., "Programmable Phase and Amplitude Femtosecond Pulse Shaping", Optics Letters 18:2032–2034, 1993.
Wefers et al., "Ultrafast Optical Waveforms" Science 262:1380–1382, 1993.
Wefers et al., "Programmable Femtosecond–Pulse Shaping and Spectroscopy", Ultrafast Phenomena IX 60:39–41, 1994.
Wefers et al., "Programmable femtosecond multiple pulse generation and spectroscopy", Ultrafast Phenomena Topical Meeting, MG4, pp. 39–41, May 2–6, 1994.
Wefers et al., "Automated femtosecond pulse shaping and multiple–pulse femtosecond spectroscopy", OSA Annual Meeting Program, WCC2, 1994.
Cambridge Research & Instrumentation Inc., Letter from Peter Miller to Marc Wefers enclosing SLM–128 information, May 12, 1994.
Wefers et al., "Generation of High–Fidelity Programmable Ultrafast Optical Waveforms", Optics Letters 20:1047–1049, 1995.

*Primary Examiner*—William L. Sikes
*Assistant Examiner*—Toan Ton
*Attorney, Agent, or Firm*—Fish & Richardson P.C.

[57] ABSTRACT

A light modulator is described which generates an output optical field from an input optical field. The light modulator features first and second polarization-rotating elements which are directly attached to one another. Each element contains an array of pixels including liquid crystals aligned along a specific axis. During operation, the pixels are biased to rotate the liquid crystals. For a particular polarization, the phase and amplitude profiles of the input optical field passing through the pixel array can be arbitrarily and independently controlled across an aperture of the light modulator.

20 Claims, 7 Drawing Sheets

HIGH-FIDELITY SPATIAL LIGHT MODULATOR

This invention was made with government support under Grant Number CHE-8901722 awarded by the National Science Foundation. The government has certain rights in the invention.

BACKGROUND

This invention relates to devices and methods for spatially modulating optical fields.

Laser-generated optical pulses are used in a wide variety of instruments, ranging from research-oriented tools, such as optical spectrometers, to more applied systems, such as digital optical communication networks. In recent years, there have been dramatic advances in the generation and characterization of optical pulses having short temporal durations which are tunable over a broad spectral range. For example, using commercially available light sources, optical pulses can be easily synthesized in the visible and infrared regions to have time-dependent durations on the order $100 \times 10^{-15}$ seconds (100 femtoseconds). Typically, these pulses have temporal profiles which are substantially Gaussian or Lorentzian in shape, and can be generated at repetition rates ranging from several Hz to hundreds of kHz. The spectral content (i.e., the bandwidth) of the pulse is inversely related to its duration, with a 100-fs optical pulse centered in the infrared spectral region typically having a bandwidth of about 20 nm.

Once a pulse has been generated, its temporal profile may be "shaped" to produce a modified optical waveform. In a general sense, pulses having durations on the order of 100 fs are shaped by modulating the pulse's optical frequencies, rather than by directly shaping the pulse's temporal envelope. Pulse shaping is typically accomplished by first spatially dispersing an input pulse's spectral components using a diffraction grating; separate light modulators can then be used to manipulate the phases or amplitudes of individual dispersed frequencies. The retarded and/or attenuated frequencies can then be recombined using a separate grating to produce the shaped output waveform. Control over the frequencies in this way enables one to generate, for example, optical square waves, multiple-pulse sequences, or complex pulse series representing digital information.

Pulse-shaping systems including active (i.e., liquid-crystal modulators) and passive (i.e., glass masks) components have been described in the prior art, with the most recent developments providing programmable, computer-driven liquid-crystal (LC) spatial light modulators (SLMs) capable of rapidly generating a wide variety of waveforms. In Patel et al., U.S. Pat. No. 5,132,824, a LC SLM array is described which allows programmable pulse shaping by modulating the phase components of a dispersed optical pulse. Additionally, independent attenuation and retardation of the frequencies of a dispersed pulse has been described by Wefers et al., Optics Letters, Vol. 18, p. 2032 (1993). In the Wefers reference, pulse shaping is performed with a two-grating, four-lens optical system used in combination with two separate LC SLMs. The first modulator attenuates the amplitudes of the individual frequency components; each frequency's phase is then manipulated by a second modulator to form the shaped pulse.

SUMMARY

In general, in one aspect, the invention provides a light modulator for generating an output optical field from an input optical field. The light modulator features a first polarization-rotating element containing a first electrode array disposed on one side of a first liquid crystal layer, with liquid crystals in the layer being substantially aligned along a first axis. A second polarization-rotating element is directly attached to the first polarization-rotating element, and includes a second electrode array disposed on one side of a second liquid crystal layer. This layer contains liquid crystals substantially aligned along a second axis. Both the first and second liquid crystal layers are positioned to independently rotate polarizations of individual components of the input optical field, thereby allowing generation of the output optical field.

In embodiments, the polarization-rotating elements are attached so that the first and second axes are substantially orthogonal. In this case, "substantially orthogonal" means that the two axes are positioned at an angle of between about 87° and 93° with respect to each other. In a particular embodiment, the input optical field is substantially polarized along a polarization axis, and the first and second axes are disposed, respectively, at about +45° and −45° relative to the polarization axis. The polarization axis may be the x-axis (defined below).

The light may additionally include a polarization optic (e.g., a polarizer) disposed in front of the first polarization-rotating element for polarizing the input optical field along the polarization axis. A second polarizing optic may be included after the second polarization-rotation element to attenuate components of the output optical field.

In other embodiments, the polarization-rotating elements are attached so that the first axis is angled at between about +42° and 48° relative to the second axis. In this case, the first axis is disposed at about 0° relative to the polarization axis, and the second axis is disposed at about +45° relative to the polarization axis.

In still other embodiments, the light modulator further includes third and fourth polarization-rotating elements containing liquid crystals substantially aligned along a third and fourth axis, respectively. In this case, the third axis is disposed at about +45° relative to the polarization axis, and the fourth axis is disposed at about +90° relative to the polarization axis.

In particular embodiments, the input optical field is an optical pulse, and the output optical field is a time-dependent waveform. In this case, individual components of the input optical field are frequency components from the optical pulse.

The inventions have many advantages. In particular, the light modulator of the invention allows one to vary independently the phase and amplitude profile of an output optical field polarized parallel or perpendicular to the input optical field. The profile can be varied across the spatial aperture of the light modulator. When used with ultrafast optical pulses, the light modulator allows one to vary the temporal phase and amplitude profiles of individual frequencies dispersed across the modulator's spatial aperture. In this case, the attenuation and retardation of the individual frequency components of the output field can be controlled with high fidelity (i.e., low distortion) and with high resolution. The light modulator is compact, easy to use, and may be adapted to commercially available light sources. Relative alignment and calibration of the polarization-rotating elements within the light modulator are performed once during an initial fabrication process. This obviates the need to perform difficult, time-consuming alignment procedures during operation. The light modulator is programmable and rapidly modulates incident optical fields to generate shaped waveforms having unique spatial and temporal patterns. The rate at which modulation takes place is limited by the response time of the liquid crystals (typically hundreds of milliseconds). Moreover, diffraction effects, normally present between separated liquid crystal SLMs used for pulse shaping, are reduced in the present invention due to the proximity and configuration of the polarization-rotating elements.

Other advantages will be apparent from the following detailed description, and from the claims.

DETAILED DESCRIPTION

Figure 1:
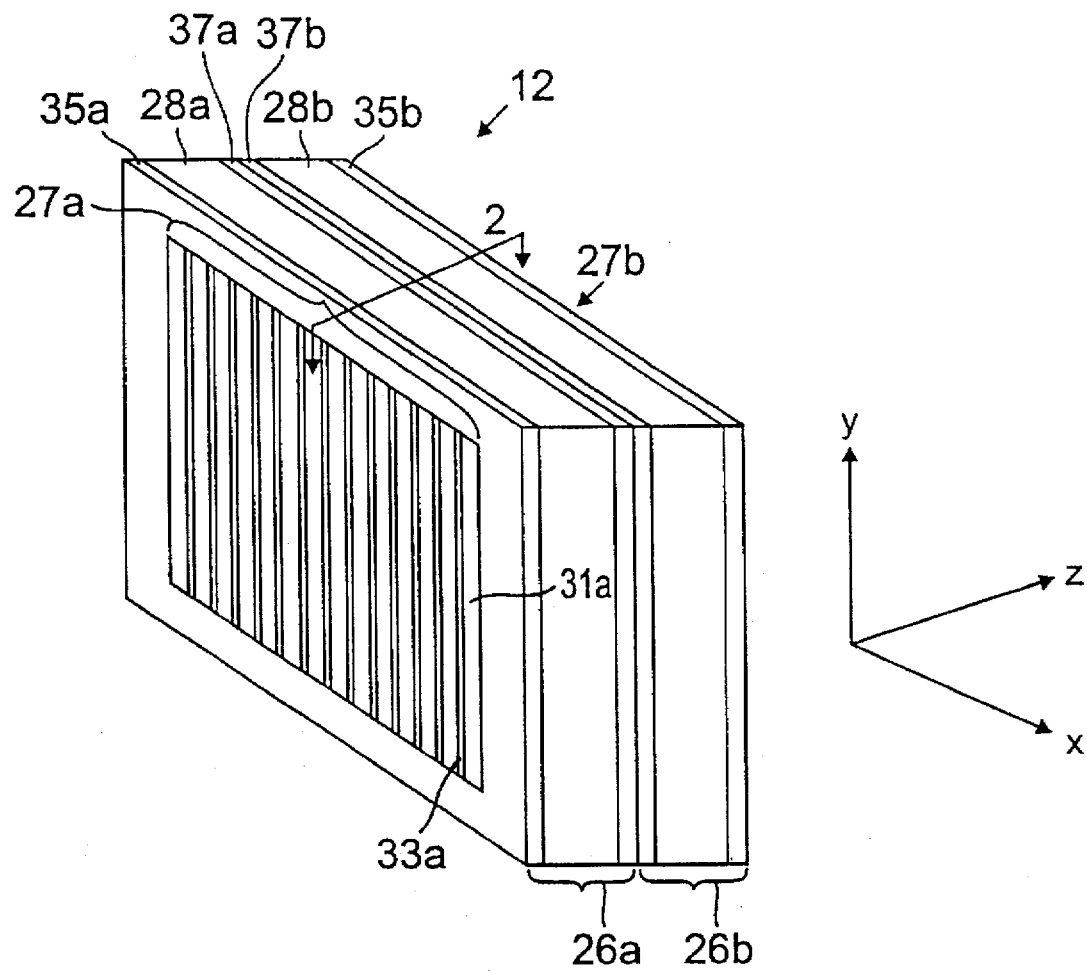
FIG. 1 is a plan view of the light modulator according to the invention.
Figure 2:
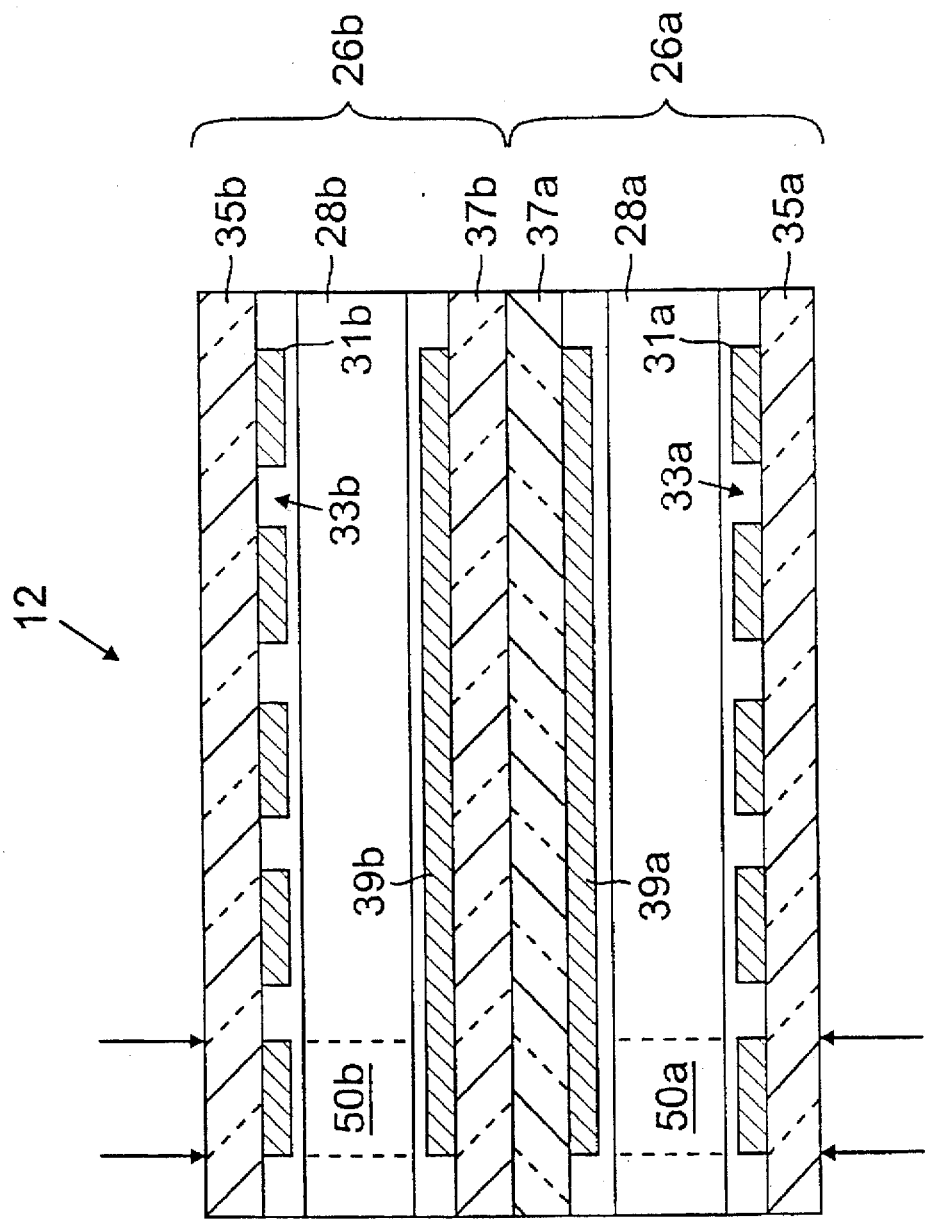
FIG. 2 is a top, cross-sectional view of two attached polarization-rotating elements included in the light modulator.

Referring to FIGS. 1 and 2, a light modulator 12 according to the invention features first 26a and second 26b polarization-rotating elements. Each polarization-rotating element 26a, 26b contains a liquid-crystal layer 28a, 28b sandwiched between a pair of substrate plates 35a, 35b, 37a, 37b. The polarization-rotating elements 26a, 26b are directly attached to each other with no light-polarizing optics disposed therebetween. The outer-lying substrate plates 35a, 35b each contain a transparent patterned electrode array 27a, 27b which includes individual vertically extending 'bars' 31a separated by 'gaps' 33a which do not contain electrode material. In addition, each polarization-rotating element includes a corresponding transparent ground electrode 39a, 39b deposited on a surface of the inner-lying substrate plate 37a, 37b. The area of the ground electrode is roughly equivalent to the collective area of the electrode bars and gaps on the opposing patterned substrate plate. Electrodes are composed of indium tin oxide (ITO), an optically transparent but electrically conductive material. Both the patterned electrode arrays 27a, 27b and ground electrodes 39a, 39b are deposited on the surfaces of the substrate plates which face the respective liquid crystal layers 28a, 28b.

Each polarization-rotating element defines an array of pixels. Each pixel is this array is defined by: 1) a bar of the patterned electrode array; 2) a portion of the ground electrode positioned opposite to the bar; and, 3) liquid crystals contained in the liquid crystal layer lying therebetween. The liquid crystals are polar, elongated rod-like molecules which have long and short axes along, respectively, the molecule's length and width.

Within each pixel, in the absence of an applied voltage, the long axes of the liquid crystals are aligned along an optical axis defined relative to the polarization of the input optical field. Pixels in the front polarization-rotating element 26a contain liquid crystals aligned along the first optical axis. In the second polarization-rotating element 26b, the pixels contain liquid crystals aligned along a second optical axis which is roughly orthogonal to the first optical axis. For example, the first and second axes are positioned at, respectively, −45° and +45° relative to the polarization of the input optical field. The two polarization-rotating elements 26a, 26b are attached such that the projections of the pixels 50a, 50b of each element are completely overlapped along the x-axis. Thus, the pixels from the two polarization-rotating elements are in register with each other.

Commerially available SLMs (manufactured, for example, by Meadowlark Optics of Longmont, Colo. and Cambridge Research Institute of Cambridge, Mass.) may be used as the individual polarization-rotating elements. In these systems, the long axes of the liquid crystals are aligned using techniques known in the art, such as by scribing the inner surfaces of each plate containing the electrode material. In order to ensure that the relative alignment of the first and second axes is proper and that the pixels are in register, the polarization-rotating elements are typically attached using a slow-cure epoxy and monitored using a polarization microscope. In this way, the SLMs can be iteratively adjusted until the desired alignment is achieved, and then permanently affixed to each other. Index-matching grease is used to coat the attached surfaces of the SLMs to minimize reflection losses at this interface.

The SLMs contain a thin (i.e., 5–20 μm) nematic liquid crystal layer sandwiched between two transparent silica substrates containing ITO electrodes. In the SLMs available from Meadowlark Optics and Cambridge Research Institute, the width of a single pixel is typically between about 90 and 100 microns, while the width of a gap is typically about 2–3 microns. Typically, these commercial SLMs contain between about 128–256 pixels, with the total electrode array occupying an area which is roughly 2 mm high and 8 mm wide. Other liquid crystal SLMs which may be used are described in Miller, U.S. Pat. No. 4,848,877, and Patel et al., U.S. Pat. No. 5,132,824, the contents of which are incorporated herein by reference.

Figure 3:
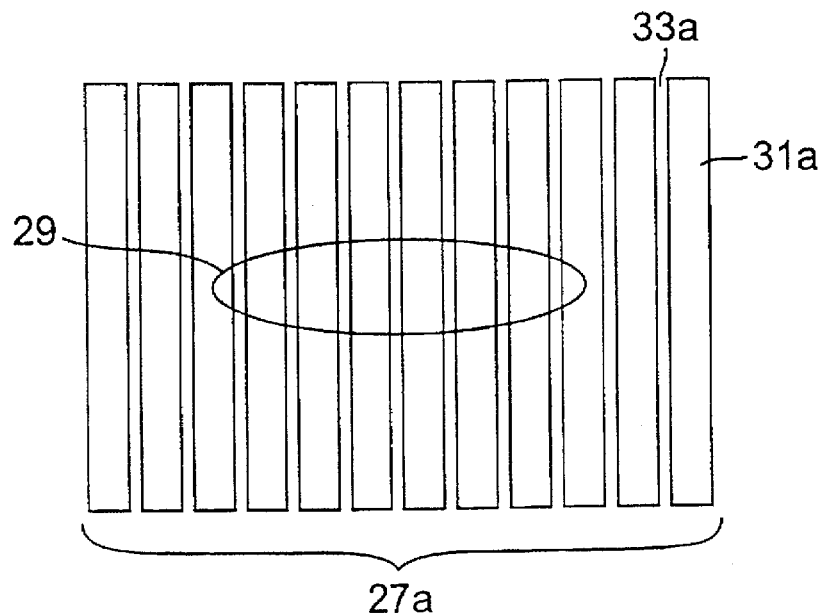
FIG. 3 is a front view of the patterned electrode array of the light modulator filtering an input optical field.
Figure 4:
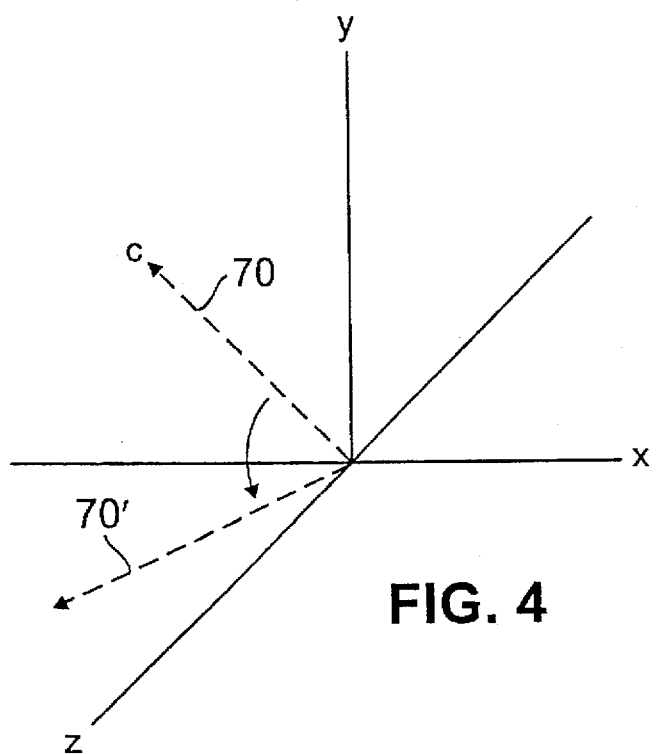
FIG. 4 is a three-dimensional plot showing the long axis of an individual liquid crystal prior to and following application of a polarization-rotating voltage.

With reference now to FIGS. 3 and 4, an input optical field propagating along the z-axis is imaged onto the pixel array 27a of the first polarization-rotating element to form a pattern 29 in the xy plane. Thus, each of the exposed pixels (indicated by the bar 31a) samples a separate, spatially distinct portion of the incident optical field. During operation, voltage is applied to each pixel to rotate the long axes of the liquid crystals from a c-axis 70, located in the xy plane, towards the z-axis in the c-z plane. The orientation of the liquid crystal's long axes rotated by the applied voltage is indicated by the arrow 70'. For an optical field propagating along the z-axis, the retardance for a component of the field polarized parallel to the liquid crystal's long axis is adjusted by varying the voltage across each pixel. A difference in retardance between polarization components along the liquid crystal's long axis and an orthogonal axis rotates the total polarization of the incident optical field from linear to an elliptical polarization. The difference in retardance ($\Delta\phi$) is given by:

$$\Delta\phi^{(1,2)} = \omega\Delta n(V)\frac{l}{c} \quad (1)$$

where $\Delta n(V)$ is the voltage-dependent birefringence, V is the applied voltage, $\omega$ is the angular frequency of the input optical field, c is the speed of light in a vacuum, and l is the liquid-crystal layer thickness. The superscripts in Equation 1 indicate the difference in retardance of pixels contained in the first and second polarization-rotating elements.

Pixels from two polarization-rotating elements which are in register independently modulate the phase and amplitude of a particular polarization component of an optical field passing through the registered pixels. For a light modulator with n pairs of registered pixels, the 'filter' $B_n$ which describes the amplitude and phase modulation for each pair of registered pixels can be expressed by a mathematical formula. When the optical axes of the registered pixels are respectively aligned at $-45°$ and $+45°$ from the input polarization along the x-axis, the filter $B_n$ for the x-polarized output optical field passing through the registered pixels is given by:

$$B_n = (\text{phase filter}) \times (\text{amplitude filter}) \quad (2)$$

where $$\text{phase filter} = \exp\left[i\frac{\Delta\phi^{(1)} + \Delta\phi^{(2)}}{2}\right] \quad (3)$$

and $$\text{amplitude filter} = \cos\left[\frac{\Delta\phi^{(1)} - \Delta\phi^{(2)}}{2}\right] \quad (4)$$

The voltage dependence for the pair of pixels n in equations 3 and 4 is implicitly included. Thus, each pair of pixels, depending on the applied voltage, is used to modulate the phase (Equation 3) and amplitude (Equation 4) of a polarization of the incident field. Since $\Delta\phi^{(1)}$ and $\Delta\phi^{(2)}$ can be arbitrarily varied using the applied voltages, the phase and amplitude of the output field can be independently controlled. Polarization components orthogonal to the input polarization will be modulated by a separate filter which is related to the mathematical formulae shown in Equations 2-4. These components can be filtered from the output field using a polarizer.

Figure 5:
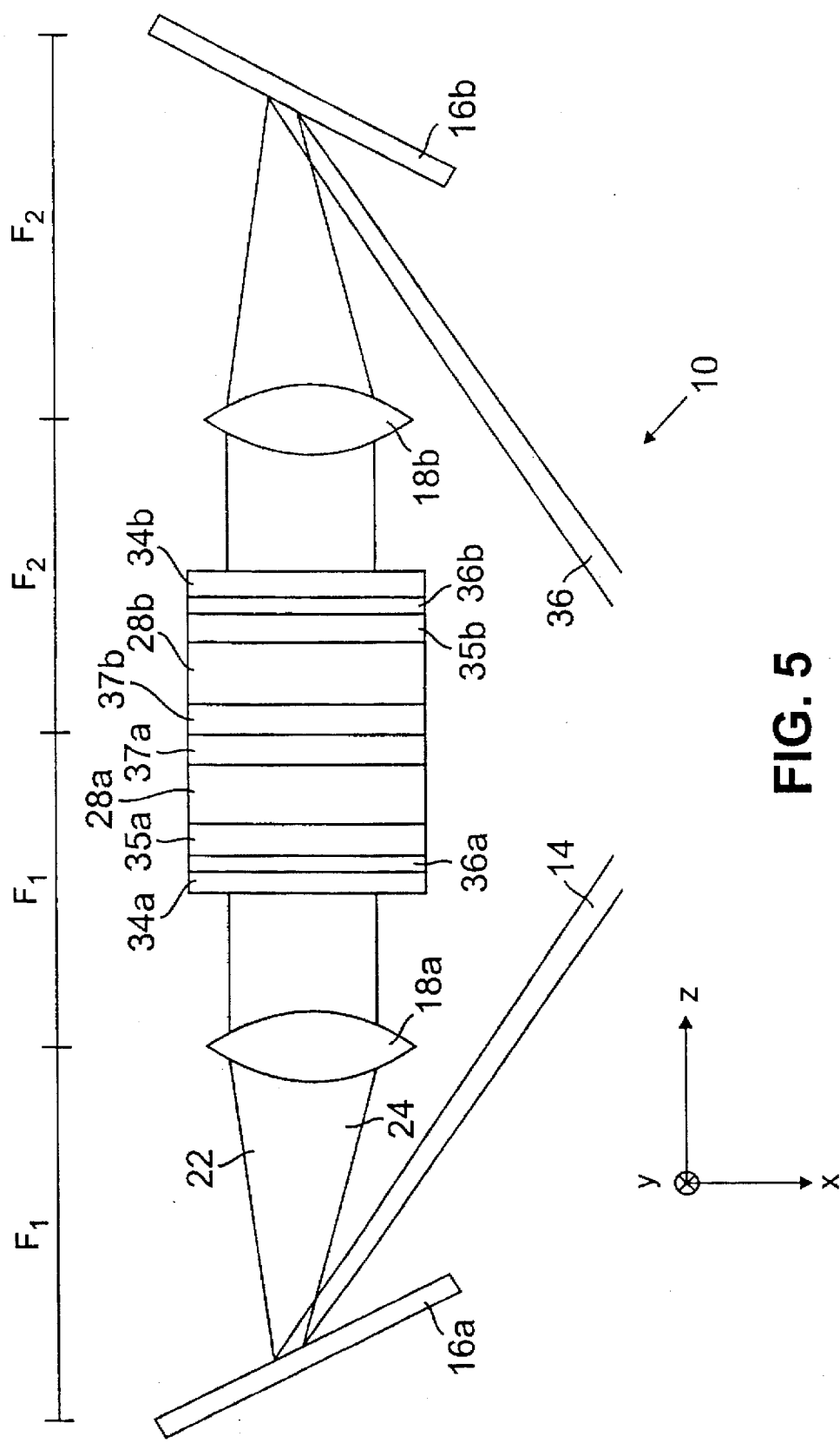
FIG. 5 is a top view of an optical system featuring a light modulator according to the invention in combination with a grating and lens pair.
Figure 6A:
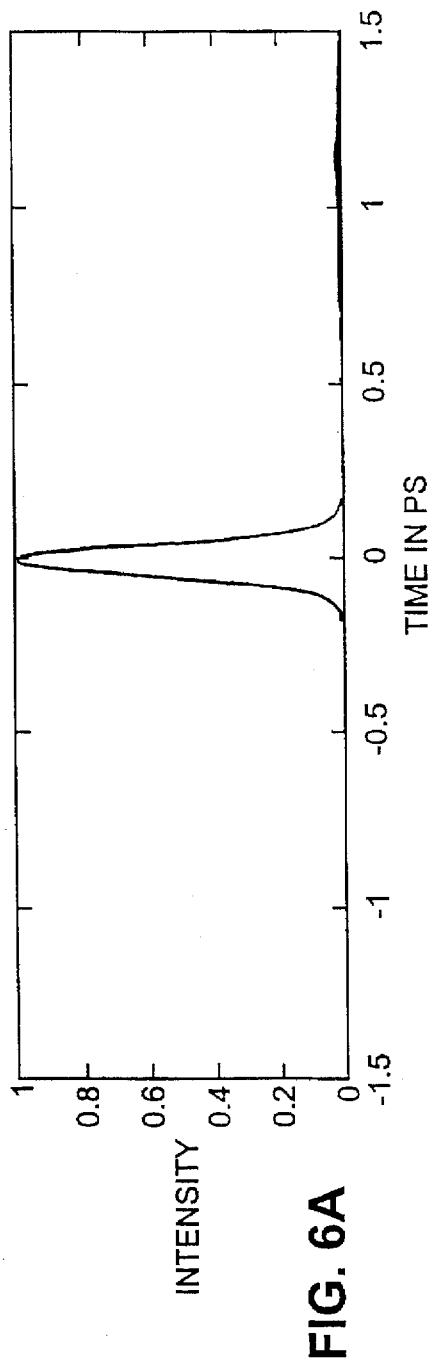
FIGS. 6A and 6B are, respectively, plots showing the time-dependent optical field intensity for the input optical pulse and the shaped output waveform.
Figure 6B:
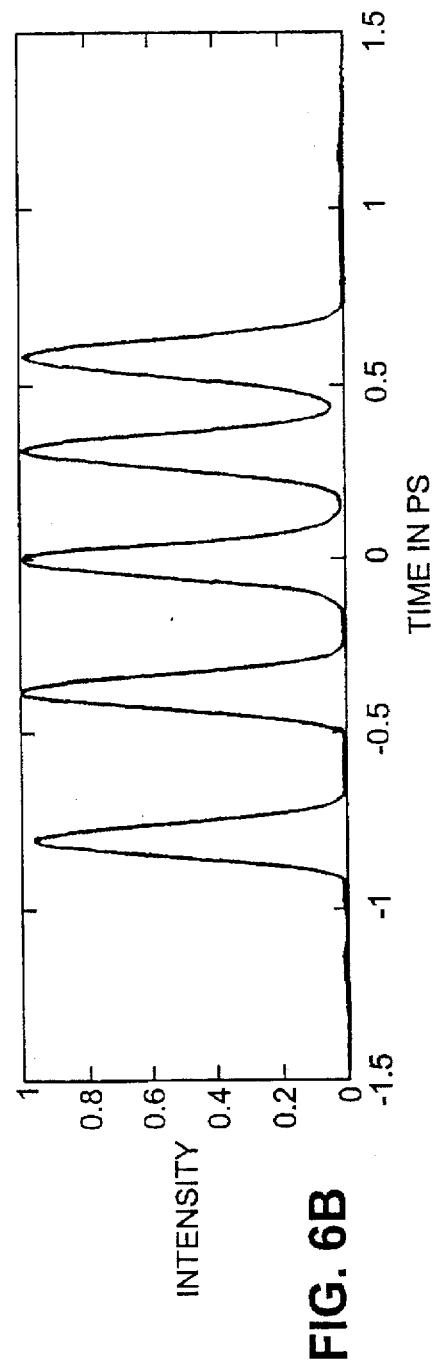

Referring now to FIGS. 5, 6A, and 6B, an optical system 10 featuring a light modulator 12 allows modulation of an input optical pulse, such as that shown in FIG. 6A, to generate a shaped output waveform, such as that shown in FIG. 6B. An incident beam 14 containing the input pulse is generated from a mode-locked laser, and individual time-dependent input pulses (each including a bandwidth of phase-locked frequencies) included in the beam are generated at the laser's repetition rate. The incident beam 14 polarized along the x axis impinges a first diffraction grating 16a. The grating 16a angularly disperses the frequency components of the input pulse along the x-axis, causing them to spread out until incident on a first lens 18a spaced along the z-axis by a focal distance $F_1$ from the grating. In the configuration shown in the figure, high optical frequencies (i.e., the "blue" spectral components) are dispersed to a region 22, while relatively low optical frequencies (i.e., the "red" spectral components) are dispersed to a region 24.

The dispersed frequencies are then imaged by the lens 18a onto the light modulator 12. The light modulator is oriented so that the linear array of registered pixel pairs is distributed along the x-axis. In this way, each registered pair of pixels contained in the light modulator is irradiated with a corresponding subset of the frequencies contained in the dispersed pulse. By controlling the voltages that are applied to each registered pixel pair, the phases and amplitudes of each of the dispersed optical frequencies passing through the array of registered pairs of pixels are independently modulated for a particular polarization. The actual number of frequencies sampled by any registered pair of pixels will depend on the characteristics (i.e., spot size and pulse duration) of the input pulse, the spacing and size of the pixels, and how the field is dispersed. In the described embodiment, the width of the imaged pattern along the x-axis is such that all the pixels are irradiated, and is about 1 cm. The height of the pattern along the y-axis is about 100 microns.

The light modulator is positioned in the front focal plane ($F_1$) of the first lens 18a. A second lens 18b is positioned along the z axis so that its focal plane ($F_2$) coincides with the focal plane of the first lens 18a. (Elements in the figure have not been drawn to scale, and have been enlarged relative to the lens and grating for clarity.) In this configuration, the lens pair forms a telescope around the light modulator. The telescope collimates the individual frequency components and bends these components toward a second grating 16b positioned in the front focal plane of the second lens 18b. The second lens 18b and grating 16b recombine each of the modulated sets of frequencies to yield a waveform having a time-dependent polarization. A computer and controller (not shown in the figure) are used to control the voltages applied to each pixel in each of the polarization-rotating elements.

As shown in FIG. 5, polarizing optics 34a, 34b may be attached via spacers 36a, 36b to the front and back surfaces of the light modulator 12. The second polarizer 34b functions to remove light which is polarized orthogonally to the input field. Removal of this polarization yields a shaped time-dependent waveform, such as that shown in FIG. 6B.

Polarization optics typically have a wavelength-dependent response, and thus should be carefully chosen to polarize the input pulse with a high (e.g., 100:1) extinction ratio. In general, spacers 36a, 36b are used to thermally isolate the polarizers (which may be heated during operation due to optical absorbance) from the polarization-rotating elements. In this case, the first polarizer 34a assures the field incident on the light modulator 12 is well-polarized along the x-axis. This function is achieved to some extent by the first diffraction grating 16a, which, depending on the density of grooves, may preferentially diffract x-polarized light. For example, a grating having 1800 lines/mm has diffraction efficiencies of about 80% and <1% for, respectively, x and y-polarized light.

Figure 7A:
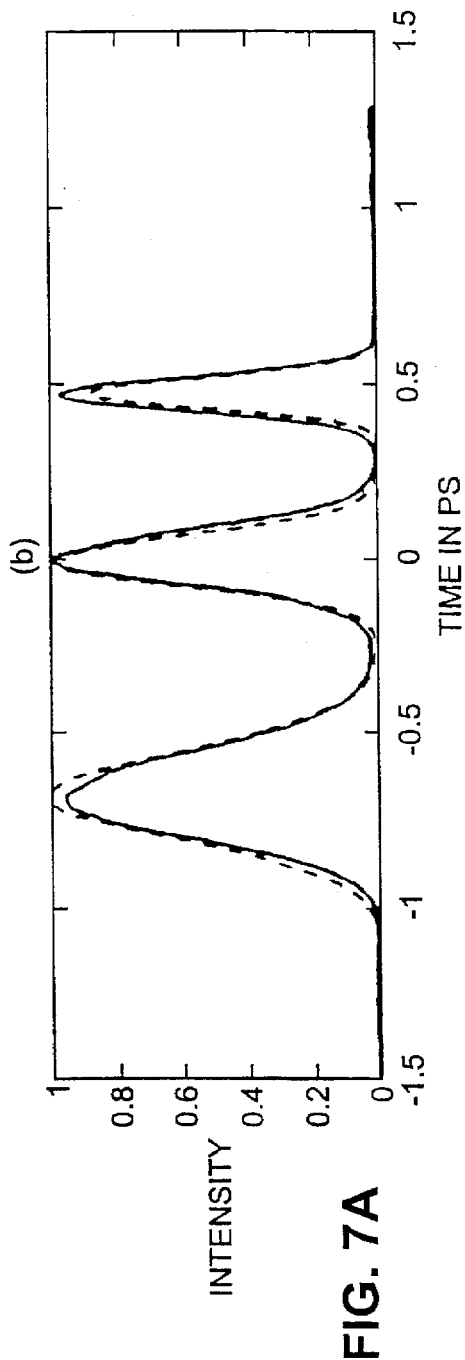
FIGS. 7A and 7B are plots showing the time-dependent intensity of two shaped output waveforms generated using the light modulator according to the invention; and, FIG. 8 is a plot showing the intensity profiles of the orthogonal polarizations (x and y) of a shaped output waveform generated with the light modulator according to the invention.
Figure 7B:
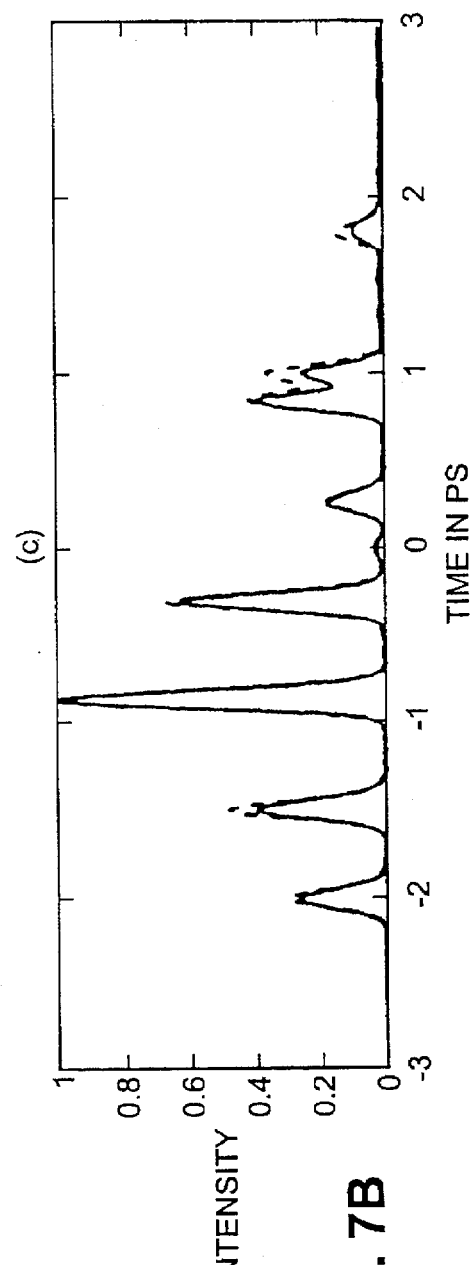

More complex time-dependent waveforms can be generated using the optical system shown in FIG. 5. For example, referring now to FIGS. 7A and 7B, following interaction with the light modulator, single, gaussian optical pulses have been shaped into complex optical waveforms containing multiple optical pulses having different temporal widths. In these experiments, the input optical pulse was generated from a Ti:sapphire oscillator producing unamplified 75-fs, transform-limited pulses at 76 MHz and 800 nm. All output waveforms were measured by cross-correlating the waveform with the input optical pulse. In each of the plots, the intensity profile of the specified output waveform is given by the dashed curve, and the experimentally generated waveform is given by the solid curve. The waveform in FIG. 7A consists of three phase-related pulses, each with a different amount of linear frequency sweep across the pulse. Though the total spectral bandwidth for the individual pulses is the same, the pulse durations increase with the degree of frequency sweep. The waveform plotted in FIG. 7B is a phase-related multiple pulse sequence, with individual pulses in the waveform having different amplitudes. This waveform is particularly effective in showing the fidelity of the light modulator. As the specified waveform becomes more complex, imperfections in alignment and calibration will more clearly manifest themselves. In both FIGS. 7A and 7B, the specified waveform (dashed curve) is clearly reproduced by the experimentally generated waveform (solid curve) with excellent fidelity.

Figure 8:
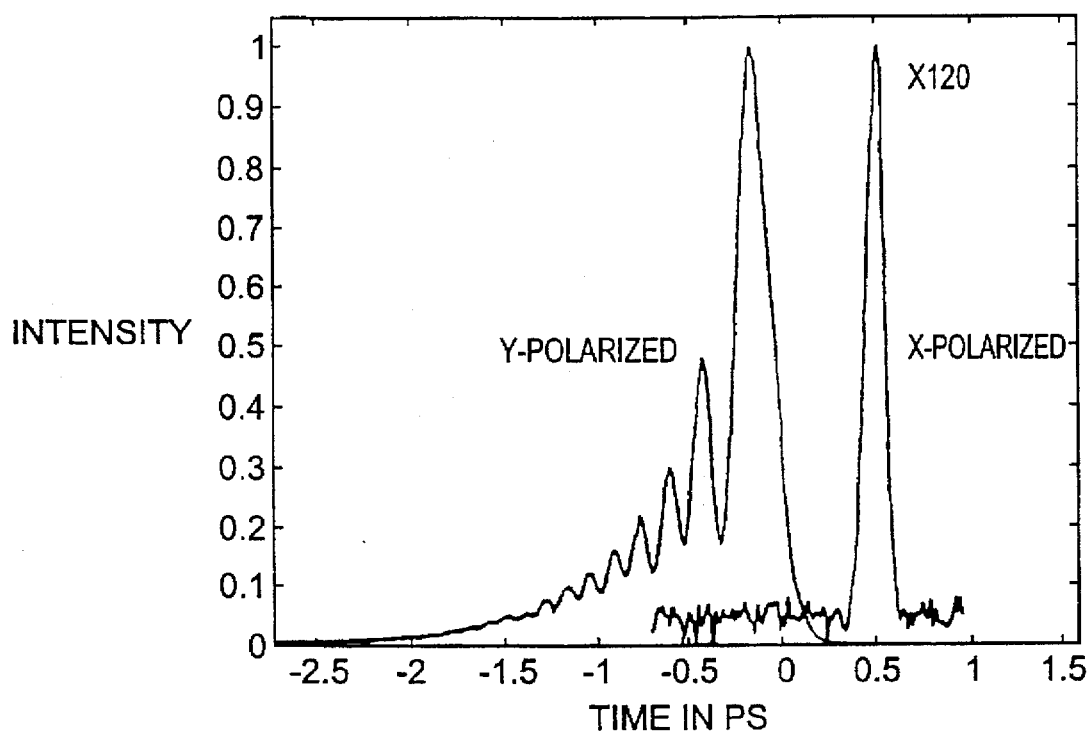

With reference now to FIG. 8, in the optical system shown in FIG. 5, the light modulator can generate waveforms with controlled polarization profiles. The waveforms were generated using filters which impart linear and cubic spectral phase sweeps on the x and y-polarized components of the output field. The light source for these experiments was identical to that described above. In the experiments, the second polarizer shown in FIG. 5 was replaced with a waveplate that rotates the polarization by 45° so that, upon being diffracted by the second grating (which has a polarization-dependent diffraction efficiency), light with the linear spectral phase sweep remains orthogonally polarized to light with the cubic spectral phase sweep. The intensity profiles for both the x and y orthogonal polarizations of the shaped output waveform were measured by cross-correlation with the input optical pulse, and are shown in FIG. 8. As expected, the linear phase sweep (i.e., x-polarized light) displaces the input pulse from t=0, and the cubic phase sweep (y-polarized light) produces a 'ringing' of the input pulse toward negative times. The poor diffraction efficiency of the 1800 line/mm grating for the y-polarized 800-nm light is reflected in the reduced amplitude of the temporally displaced pulse. Note that the optical phase relationship between the two waveforms is specified and that the waveforms would interfere coherently if they overlapped temporally.

Although the waveforms show in FIGS. 6–8 have time-dependent profiles; it is understood that the light modulator of the invention can also be used to spatially modulate time-independent optical fields to generate output waveforms having varying spatial profiles. In this case, rather than modulating frequency components of a dispersed optical pulse, a single-frequency field is imaged onto the pixel array of the light modulator; each pair of registered pixels samples a different portion of the field. By controlling the voltage applied to each pixel in the polarization-rotating elements, the relative phases and amplitudes of different portions of the incident field along one polarization can be independently controlled.

Moreover, while the devices shown in FIGS. 1, 2, and 5 contain patterned electrode substrate plates 35a, 35b on the outer surfaces of the attached polarization-rotation elements, and substrate plates containing the ground electrodes sandwiched therebetween, it is understood that other configurations are also possible. For example, patterned and ground substrate plates can be alternately stacked, or, alternatively, positioned so that the patterned plates are sandwiched between outer-lying ground plates. In addition, the long axes of the liquid crystals may be kept orthogonal, but disposed at angles other than the +45°, −45° configuration. In this case, it may be necessary to include additional optical elements in the optical system (e.g., waveplates) to account for the fact that the diffraction gratings included therein preferentially diffract x-polarized light.

Alternatively, other angular separations between the first and second optical axes, such as 45°, may be employed. For example, the first and second optical axes may be disposed at 0° and 45° relative to the polarization of the input field.

In this configuration, for incident light polarized along the y-axis the resulting phase and amplitude filters for a pair of registered pixels are given by:

$$\text{phase filter} = \exp[i\Delta\phi^{(1)}]\exp\left[\frac{i\Delta\phi^{(2)}}{2}\right] \tag{5}$$

and $$\text{amplitude filter} = \sin\left[\frac{\Delta\phi^{(2)}}{2}\right] \tag{6}$$

where the superscripts denote the first or second polarization-rotating element and the pixel-dependent voltage for the retardances has been implicitly included. In this case, the filters shown in Equations 5 and 6 act on the y-polarized field to produce an output field along the x-axis. Polarization components along the y-axis will be modulated by a separate filter which is related to the functional form shown in Equations 5–6. These components can be filtered from the output optical field using a polarizer.

To produce a filter wherein the phase and amplitude are independently modulated along orthogonal polarizations, a light modulator containing four polarization-rotating elements is used. In a particular example, the light modulator shown in FIG. 5 could be followed by two more polarization-rotation devices, with their liquid-crystal layers respectively aligned at 45° and 90° with respect to the x-axis. In this case, the pixels from each of the four polarization-rotating elements must be in register. The total filter $B_n$ (including both phase and amplitude filters) for the four registered pixels for x-polarized light is given by:

$$B_n = \cos\left[\frac{\Delta\phi^{(1)} - \Delta\phi^{(2)}}{2}\right] \times \exp\left[i\frac{\Delta\phi^{(1)} + \Delta\phi^{(2)}}{2}\right] \times \tag{7}$$
$$\left[\vec{x}\cos\left[\frac{\Delta\phi^{(3)}}{2}\right] + \vec{y}\sin\left[\frac{\Delta\phi^{(3)}}{2}\right]\exp[i\Delta\phi^{(4)}]\right]$$

which provides an independent arbitrary filter for both polarizations. Here, note that the diffraction efficiency of the gratings, which is usually polarization sensitive, also needs to be considered. This filter acts on the input x-polarized light to produce portions of output optical fields wherein phases and amplitudes can be independently controlled along both the x and y axes.

A more detailed analysis of the theory of optical pulse-shaping using the devices described herein is included in Wefers et al., "Generation of high-fidelity programmable ultrafast optical waveforms", Optics Letters, Vol. 20, No. 9, May 1, 1995, the contents of which are incorporated herein by reference.

During fabrication of the light modulator, it is particularly desirable that the pixels of the polarization-rotating elements be in register. If they are out of register, the light modulator will be unable to generate high-fidelity output waveforms. Significant degradation of the output waveform will also occur if the optical axes of the registered pixels are not orthogonal to each other. This reduces the user's ability to accurately control the phase and amplitude of the modulated optical field. In addition, relative displacement (i.e., spacing) of the polarization-rotating elements should also be optimized, although this adjustment is less critical. Typically, it is desirable to make the entire light modulator as thin as possible so that, during operation, it may be positioned entirely within the focus of an imaging lens.

The light modulators described above may be used in combination with any optical system producing time-independent optical fields or short (i.e., less than about 500 fs) optical pulses. For example, the light modulator and lens and grating pairs shown in FIG. 5 may be used with a Ti:sapphire laser, ultrafast dye laser, optical parametric oscillator, or other ultrafast system to generate shaped waveforms. Once generated, these waveforms may be used for a variety of applications, such as for optical communications, computing, optical decoding, and for spectroscopic applications.

Other embodiments are within the scope of the following claims.

What is claimed is:

1. A light modulator for generating an output optical field from an input optical field, said light modulator comprising:
    a first polarization-altering element comprising a first electrode array disposed on one side of a first liquid crystal layer, said first liquid crystal layer containing liquid crystals substantially aligned along a first axis, and
    a second polarization-altering element, directly attached to said first polarization-altering element, comprising a second electrode array disposed on one side of a second liquid crystal layer, said second liquid crystal layer containing liquid crystals substantially aligned along a second axis,
    said first and second liquid crystal layers being oriented to independently modulate the phase and amplitude of a selected polarization of a spatial component of the input optical field to generate the output optical field in response to a first voltage being applied to an electrode of the first electrode array and a second voltage being applied to a corresponding electrode of the second electrode array, said electrode of the first electrode array overlapping with said corresponding electrode of the second electrode array.

2. The light modulator of claim 1, wherein said polarization-altering elements are attached so that said first axis is substantially orthogonal to said second axis.

3. The light modulator of claim 2, wherein the input optical field is substantially polarized along a polarization axis, said first axis is disposed at about +45° relative to the polarization axis, and said second axis is disposed at about −45° relative to the polarization axis.

4. The light modulator of claim 3, further comprising a polarization optic disposed in front of said first polarization-altering element for polarizing the input optical field along the polarization axis.

5. The light modulator of claim 3, wherein said polarization axis is along a width of the light modulator.

6. The light modulator of claim 1, further comprising a polarization optic disposed after said second polarization-altering element.

7. The light modulator of claim 1, wherein said polarization-altering elements are attached so that said first axis is angled at about between +/−42° and +/−48° relative to said second axis.

8. The light modulator of claim 7, wherein the input optical field is substantially polarized along a polarization axis, said first axis is disposed at about 0° relative to the polarization axis, and said second axis is disposed at about +45° relative to the polarization axis.

9. The light modulator of claim 1, further comprising a third polarization-altering element comprising a third electrode array disposed on one side of a third liquid crystal layer, said third liquid crystal layer containing liquid crystals substantially aligned along a third axis, and
    a fourth polarization-altering element, attached to said third polarization-altering element, comprising a fourth electrode array disposed on one side of a fourth liquid crystal layer, said fourth liquid crystal layer containing liquid crystals substantially aligned along a fourth axis.

10. The light modulator of claim 9, wherein the input optical field is substantially polarized along a polarization axis, said first axis is disposed at about +45° relative to the polarization axis, and said second axis is disposed at about −45° relative to the polarization axis.

11. The light modulator of claim 9, wherein said third axis is disposed at about +/−45° relative to the polarization axis, and said fourth axis is disposed at about +90° relative to the polarization axis.

12. The light modulator of claim 1, wherein said input optical field is an optical pulse, and said output optical field is a time-dependent waveform.

13. The light modulator of claim 12, wherein said spatial component of said input optical field corresponds to a frequency component of said optical pulse.

14. The light modulator of claim 1, wherein the phase can be smoothly modulated between 0 and $2\pi$ radians and the amplitude can be smoothly modulated between a minimum value that is approximately equal to zero and a larger maximum value.

15. The light modulator of claim 1, wherein the first and second polarization altering elements are permanently affixed to each other.

16. The light modulator of claim 1 further comprising an epoxy affixing the first and second polarization altering elements directly to each other.

17. A light modulator for generating a time-dependent output optical waveform from a time-dependent input optical waveform, said light modulator comprising:
    a first polarization-altering element comprising a first electrode array disposed on one side of a first liquid crystal layer, said first liquid crystal layer containing liquid crystals substantially aligned along a first axis, and
    a second polarization-altering element, directly attached to said first polarization-altering element, comprising a second electrode array disposed on one side of a second liquid crystal layer, said second liquid crystal layer containing liquid crystals substantially aligned along a second axis,
    said first and second liquid crystal layers being oriented to independently modulate the phase and amplitude of a selected polarization of an individual frequency component of the time-dependent input optical waveform to generate the time-dependent output optical waveform in response to a first voltage being applied to an electrode of the first electrode array and a second voltage being applied to a corresponding electrode of the second electrode array, said electrode of the first electrode array overlapping with said corresponding electrode of the second electrode array.

18. A light modulator for generating an output optical field from an input optical field, said light modulator comprising:
    a first polarization-altering element comprising a first electrode array disposed on one side of a first liquid crystal layer, said first liquid crystal layer containing liquid crystals substantially aligned along a first axis; and
    a second polarization-altering element, directly attached to said first polarization-altering element, comprising a second electrode array disposed on one side of a second liquid crystal layer, said second liquid crystal layer containing liquid crystals substantially aligned along a second axis angled at about between +/−42° and +/−48° relative to said first axis;

said first and second liquid crystal layers independently altering polarizations of individual spatial components of the input optical field to generate the output optical field.

19. The light modulator of claim 18, wherein the input optical field is substantially polarized along a polarization axis, said first axis is disposed at about 0° relative to the polarization axis, and said second axis is angled at about +45° relative to the polarization axis.

20. A light modulator for generating an output optical field from an input optical field, said light modulator comprising:

a first polarization-altering element comprising a first electrode array disposed on one side of a first liquid crystal layer, said first liquid crystal layer containing liquid crystals substantially aligned along a first axis;

a second polarization-altering element, directly attached to said first polarization-altering element, comprising a second electrode array disposed on one side of a second liquid crystal layer, said second liquid crystal layer containing liquid crystals substantially aligned along a second axis;

a third polarization-altering element comprising a third electrode array disposed on one side of a third liquid crystal layer, said third liquid crystal layer containing liquid crystals substantially aligned along a third axis; and a fourth polarization-altering element, attached to said third polarization-altering element, comprising a fourth electrode array disposed on one side of a fourth liquid crystal layer, said fourth liquid crystal layer containing liquid crystals substantially aligned along a fourth axis, wherein said third axis is angled at about +/−45° relative to a polarization of the input optical field, and said fourth axis is angled at about +90° relative to the polarization of the input optical field, and said first, second, third and fourth liquid crystal layers are oriented to alter the initial polarization of a spatial component of the input optical field into a different polarization to generate the output optical field.

\* \* \* \* \*